United States Patent
Kumar et al.

(10) Patent No.: US 9,213,554 B2
(45) Date of Patent: Dec. 15, 2015

(54) GENERIC CHART INTERFACE

(75) Inventors: Amar Kumar, Neulussheim (DE);
Wolfgang E. Walter, Hambreucken (DE)

(73) Assignee: SAP SE, Walldorf (DE)

( * ) Notice: Subject to any disclaimer, the term of this patent is extended or adjusted under 35 U.S.C. 154(b) by 1396 days.

(21) Appl. No.: 11/634,000

(22) Filed: Dec. 4, 2006

(65) Prior Publication Data

US 2008/0134059 A1  Jun. 5, 2008

(51) Int. Cl.
*G06F 9/44* (2006.01)
*G06T 11/20* (2006.01)

(52) U.S. Cl.
CPC ........... *G06F 9/4443* (2013.01); *G06T 11/206* (2013.01); *G06F 2209/544* (2013.01)

(58) Field of Classification Search
USPC ........................................ 715/212, 760, 765
See application file for complete search history.

(56) References Cited

U.S. PATENT DOCUMENTS

| | | | |
|---|---|---|---|
| 6,393,422 B1* | 5/2002 | Wone | 707/10 |
| 6,614,433 B1* | 9/2003 | Watts | 345/440 |
| 6,920,608 B1* | 7/2005 | Davis | 715/209 |
| 6,988,241 B1* | 1/2006 | Guttman et al. | 715/220 |
| 2002/0010725 A1* | 1/2002 | Mo | G06F 17/214 715/205 |
| 2003/0055711 A1* | 3/2003 | Doherty | G06Q 30/02 705/7.33 |
| 2003/0212953 A1* | 11/2003 | Serraf | 715/503 |
| 2003/0218619 A1* | 11/2003 | Ben-Tovim | G06F 3/04845 345/649 |
| 2005/0268215 A1* | 12/2005 | Battagin et al. | 715/503 |
| 2006/0015806 A1* | 1/2006 | Wallace | 715/503 |
| 2006/0036937 A1* | 2/2006 | Cho et al. | 715/501.1 |
| 2007/0250764 A1* | 10/2007 | Jiang | 715/503 |

OTHER PUBLICATIONS

Create a Graph, http://web.archive.org/web/20051126043427/http://nces.ed.gov/nceskids/graphing/classic/, Nov. 26, 2005.*

* cited by examiner

*Primary Examiner* — Thanh Vu

(74) *Attorney, Agent, or Firm* — Dilworth IP LLC

(57) ABSTRACT

Methods and software to produce a chart from data and parameters supplied by a client through a generic interface. Created charts are accessible via a Uniform Resource Locator ("URL") returned to the client through the generic interface. Multiple chart producers with different interfaces are supported.

16 Claims, 6 Drawing Sheets

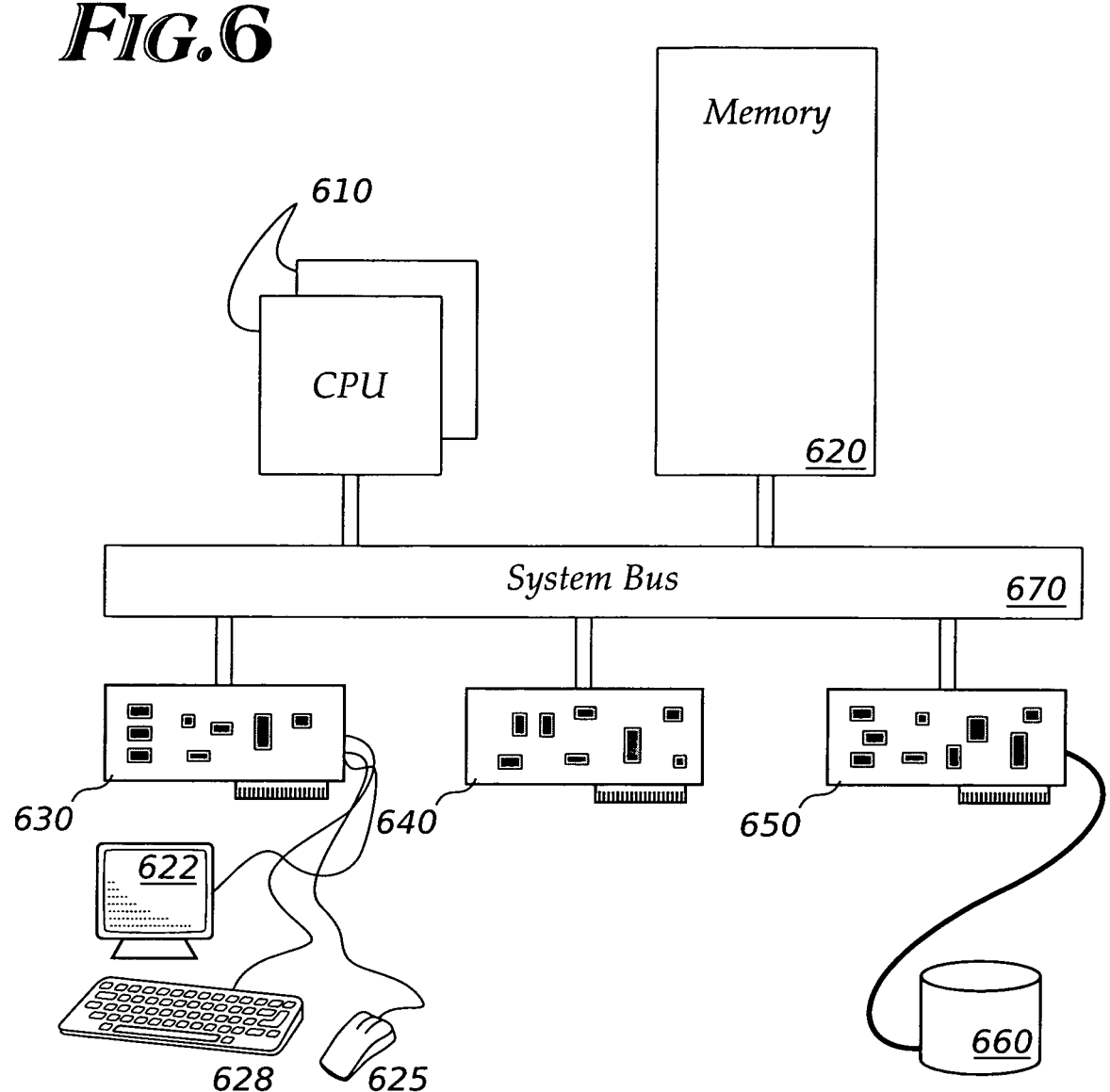

GENERIC CHART INTERFACE

FIELD

The invention relates to producing charts from data. More specifically, the invention relates to methods and systems to interface between a chart requestor and chart producers.

BACKGROUND

Computers and data processing systems are often used to perform complex manipulations and calculations on large data sets. Once the data is processed as desired, it often presented to the user for review. For large, multi-dimensional and/or amorphous data sets, the raw data may be difficult to interpret. Graphical representations such as pie charts, bar charts, scatter plots, graphs, and similar visual aids can convey the information in a data set more effectively than lists and tables of numbers.

Some data processing applications incorporate their own chart-generating functions, but these functions may be insufficiently flexible to produce effective charts of certain complex data sets. On the other hand, applications with powerful charting functions may require that the data to be charted also be processed by (or at least imported into) the same application. In the latter case, a developer may face extra work moving data from system to system, or configuring the powerful charting application to also perform the desired data manipulations. Furthermore, this work may not be reusable if different data processing or charting functions from another application are to be incorporated into a system.

Existing approaches such as Microsoft's Object Linking and Embedding ("OLE") permit some interaction between data processing and charting applications, but the interacting entities (e.g. software applications) are tightly coupled and require extensive and detailed knowledge of their partner's internal structures and operations.

A system to decouple data processing activities from chart preparation, and to permit "mix-and-match" selection of desired features, may be of value in this field.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIG. 6 shows some components of a computer system that implements an embodiment of the invention.

DETAILED DESCRIPTION

Embodiments of the invention establish a generic protocol and interfaces through which a client provides data and parameters to an arbitrary chart producing service, and receives in return a resource identifier that can be used to retrieve the chart in a commonly-supported format.

Figure 1:
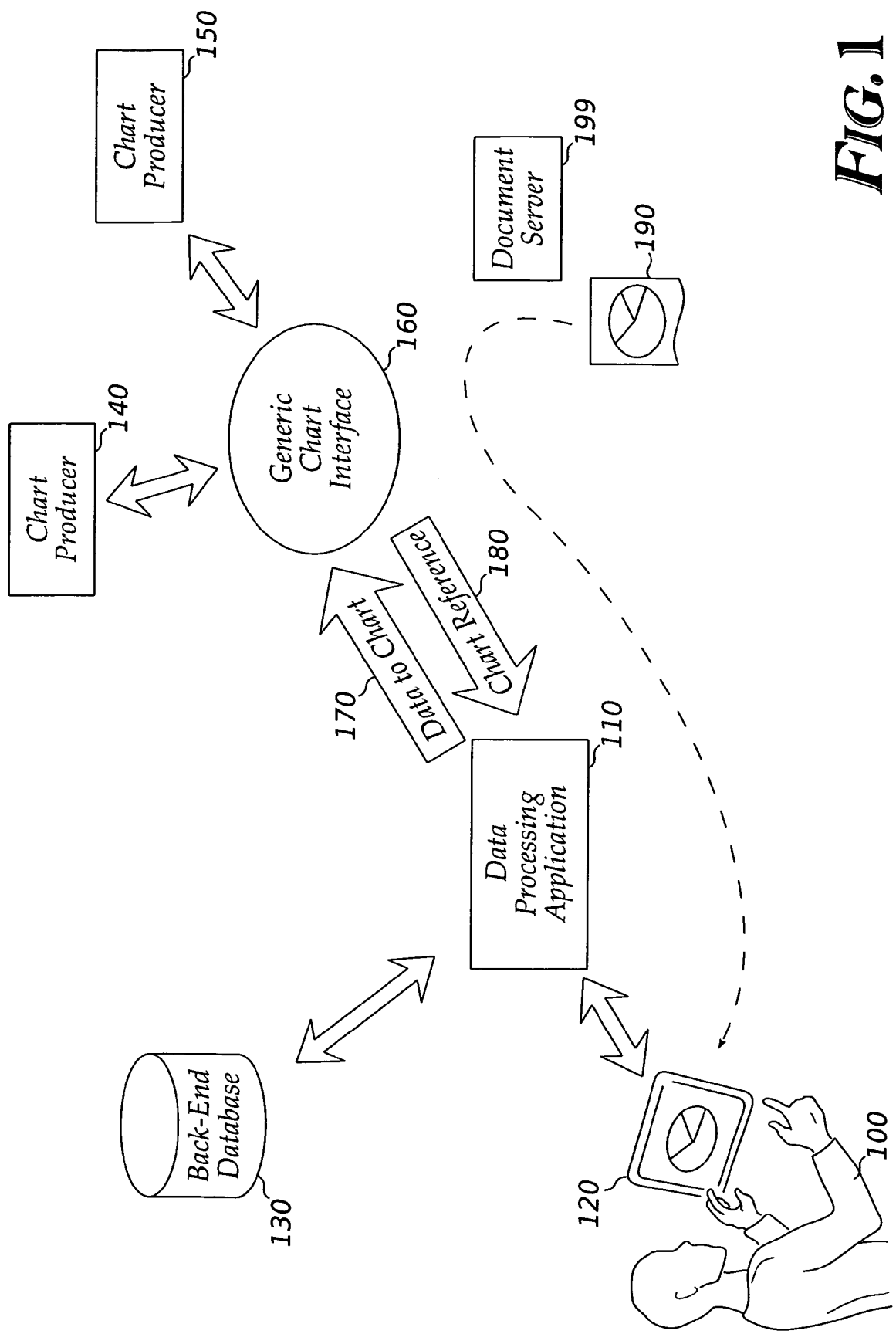
FIG. 1 shows a data processing environment where an embodiment of the invention operates.

FIG. 1 shows a data processing environment where an embodiment of the invention is in use. A user 100 interacts with a data processing application 110 through a user interface that includes a graphical display device 120. Data processing application 110 may retrieve and/or modify data stored in a back-end database 130, which may be located remotely from a system where application 110 executes. When user 100 requests a graphical representation of the data he is working on, data processing application 110 interacts with one or more chart producers 140, 150 through a generic chart interface 160, sending data and parameters 170 to the chart producer(s) and receiving a chart reference 180 in return. Chart reference 180 can be used by data processing application 110 to retrieve a representation of the chart 190 from a document server 199. The chart is presented on graphical display 120.

Chart producers 140 and 150 may operate on different systems and may require different protocols or interface methods to access their charting functionality. Generic chart interface 160 accommodates these different interfaces, so that data processing application 110 need not implement two (or more) different chart request logic subsystems. The generic interface is independent of both the chart client (which supplies the source data) and the chart producer, so it can be used by any client and can arrange for charts to be prepared by any producer.

Figure 2A:
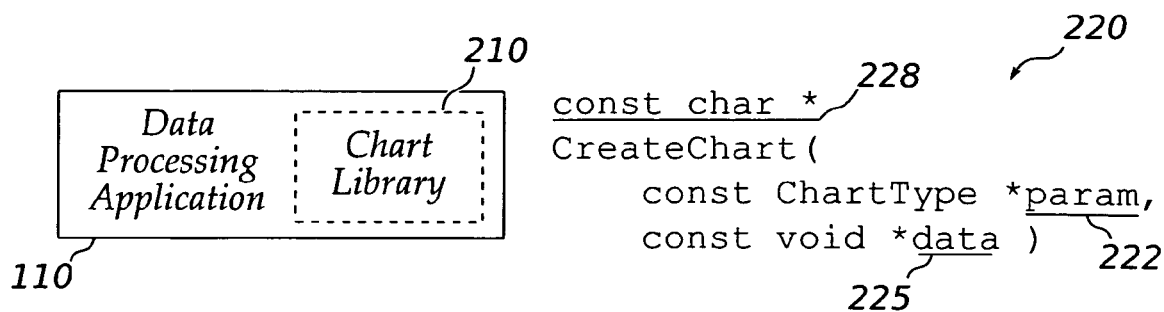
FIGS. 2A-2C show several possible software configurations.
Figure 2B:
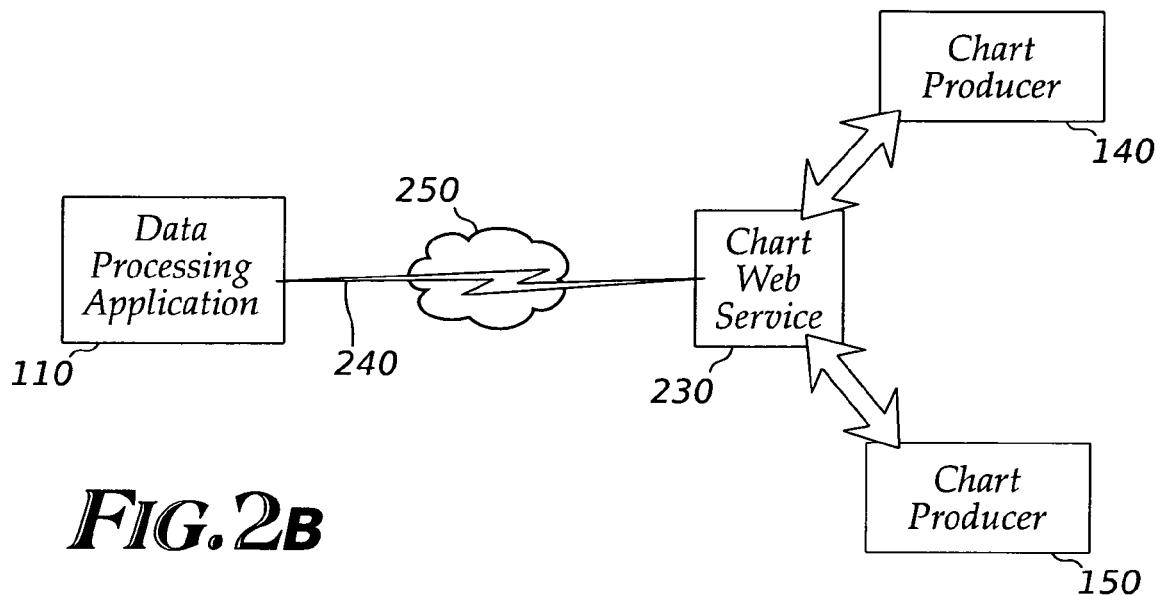
Figure 2C:
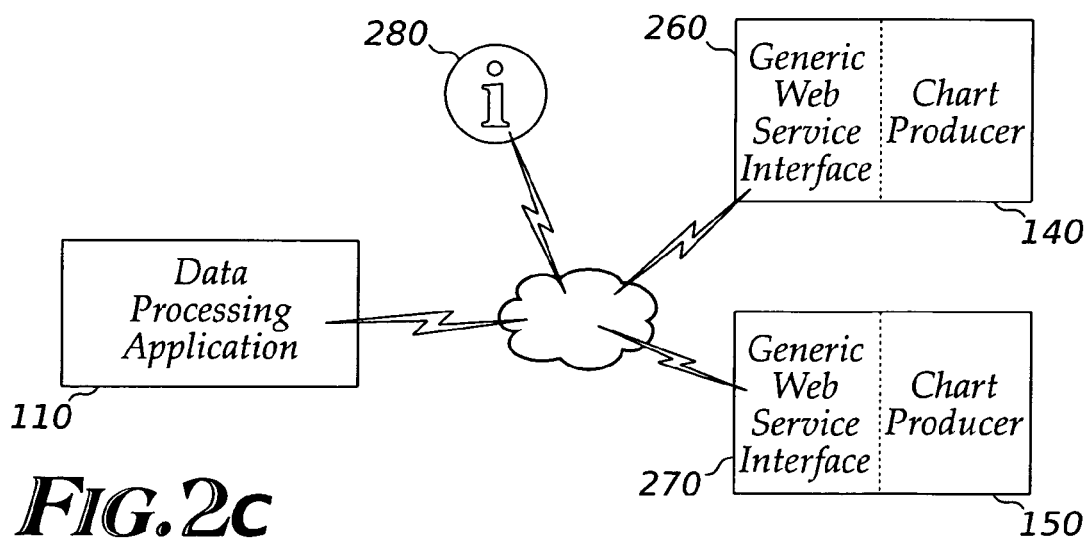

The eponymous generic chart interface shown as element 160 in FIG. 1 can be implemented in a number of different ways. Several of these are shown in FIG. 2A-2C. FIG. 2A shows an implementation that places the interface functionality in a library 210 that is linked (either statically or dynamically) with a data processing application 110. Other applications (not shown), also linked with the library, can take advantage of the chart generation facilities as well. From the application's perspective, chart generation functions are accessed through ordinary subroutine calls. Element 220 shows a possible subroutine "signature:" the CreateChart subroutine receives a data structure 222 containing parameters describing the desired chart and the data 225 which are to be charted. The return value 228 of this subroutine is a reference to the created chart, which the data processing application can subsequently retrieve and display. Executable instructions within library 210 prepare the application's data, invoke one or more chart producers, and arrange for the charts to be retrievable through the returned reference.

FIG. 2B shows the chart creation functionality offered as a web service 230, which data processing application 110 can use by establishing a communication channel 240 over a local area network ("LAN"), wide area network ("WAN") or distributed data network such as the Internet (various networks indicated in this Figure as element 250). Web service 230 may operate as a translator to repackage chart requests from data processing application 110 into a format appropriate for one of several chart producers 140, 150.

FIG. 2C shows an alternate web-service arrangement, where instead of a single web service operating as a translator or interface adaptor for several chart producers, each chart producer 140, 150 offers its services through a separate network interface 260, 270 that complies with the generic interface. Chart producers 140 and 150 can register their services with an information broker 280 such as a Universal Description Discovery and Integration ("UDDI") server. After the producers have published the availability of their services, data processing application 110 can query the information broker 280 to find chart producers 140, 150 and retrieve protocol information enabling charts to be requested. Protocol information may include parameter types and orders, serialization requirements, and other service-usage conditions.

Figure 3:
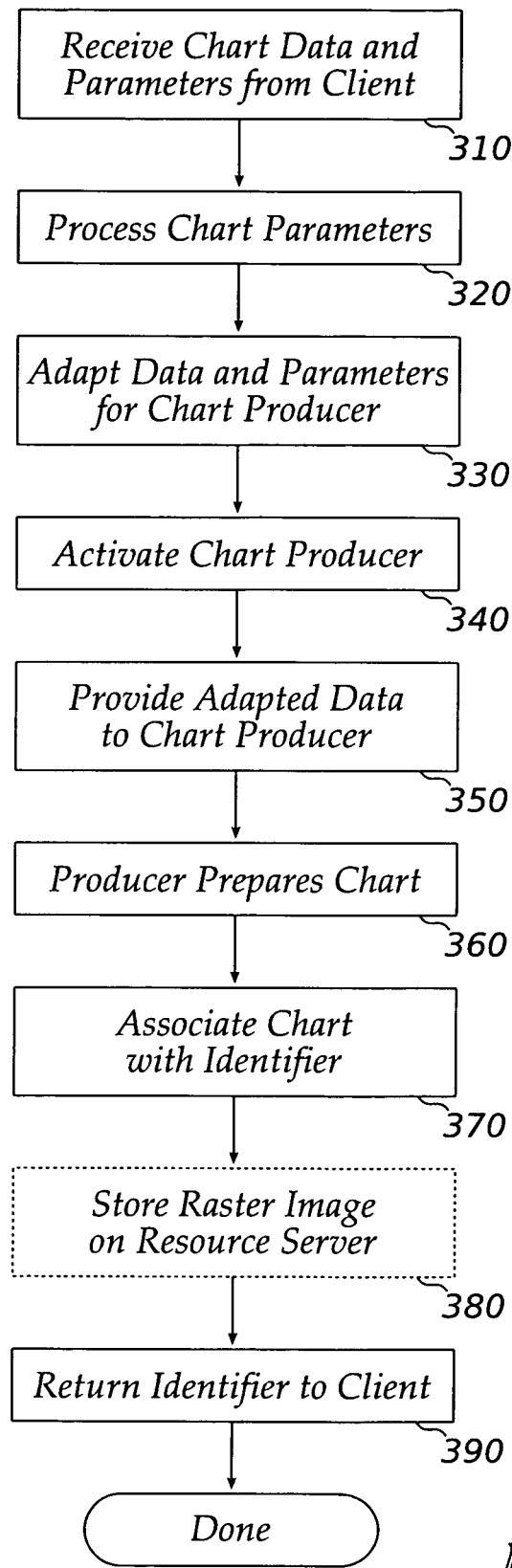
FIG. 3 is a flow chart that outlines operations of an embodiment of the invention.

FIG. 3 outlines a method used by an embodiment of the invention. First, data and parameters describing the chart are received from a client (310). As described above, the information may arrive as parameters to a subroutine call, through a network data connection, or through another communication channel. The parameters are processed (320) to determine what sort of chart is desired, what format the data is in, etc. For example, parameters may specify a type of chart (e.g. pie chart, bar chart, scatter plot, three-dimensional projection); size, colors and fonts; titles; and other auxiliary information. Some parameters may not be meaningful to some chart producers.

The client's data and parameters are adapted to a format appropriate for a chart producer (330) and the chart producer is activated (340). The adapted data is provided to the producer (350), which prepares the requested chart (360). The chart is associated with an identifier (370) such as a Uniform Resource Locator ("URL"). In some embodiments, the chart producer may generate a raster graphic image (i.e. an array of pixels described in a format such as the Graphics Interchange Format ("GIF"), Joint Photographic Experts Group ("JPEG"), or Portable Network Graphics ("PNG")). In other embodiments, the chart producer's output may be converted to a raster graphic format by logic within the generic chart interface. The image may be stored on a resource server (380) such as a Hypertext Transfer Protocol ("HTTP") server (commonly called a "web server") so that it can be retrieved via the identifier. Some chart producers may implement an internal resource server, so that the created chart can be retrieved directly from the producer rather than from an auxiliary web server. Finally, the identifier is returned to the client (390).

In some embodiments, the chart client (e.g. data processing application 110) may provide a reference to the chart data through the generic chart interface, instead of providing the data itself. The chart producer may subsequently monitor the referenced data and produce an updated chart if the data changes. Alternatively, the chart client could trigger the production of an updated chart when desired through a function provided by the generic interface. In either situation, a new chart representation could overwrite the old representation at the chart reference identifier, or a new reference identifier could be provided, from which the client could obtain the updated chart.

A chart client can display a chart by adding a Hypertext Markup Language ("HTML") browser component to its user display. The HTML browser can be configured to retrieve and display data at a URL, where the URL is the chart reference identifier obtained through the generic chart interface. An automatic refresh feature of the HTML browser can be used to present up-to-date charts of dynamically-changing information.

Embodiments of the invention can achieve greater generality and usefulness by providing an abstract way for a client to describe its data and the chart it desires. It is preferred that a generic chart interface avoid imposing data restrictions, and instead provide a flexible data description mechanism so that a client can express the format and structure of its data. To provide the broadest applicability, an interface may accept one or more arbitrarily-dimensioned arrays of data and permit the client to specify mappings between axes of the arrays and features of the chart. Client data may include both numeric data to be represented by a color, size or position of an element of the chart; and textual data, which may be rendered on the chart as a label.

Figure 4:
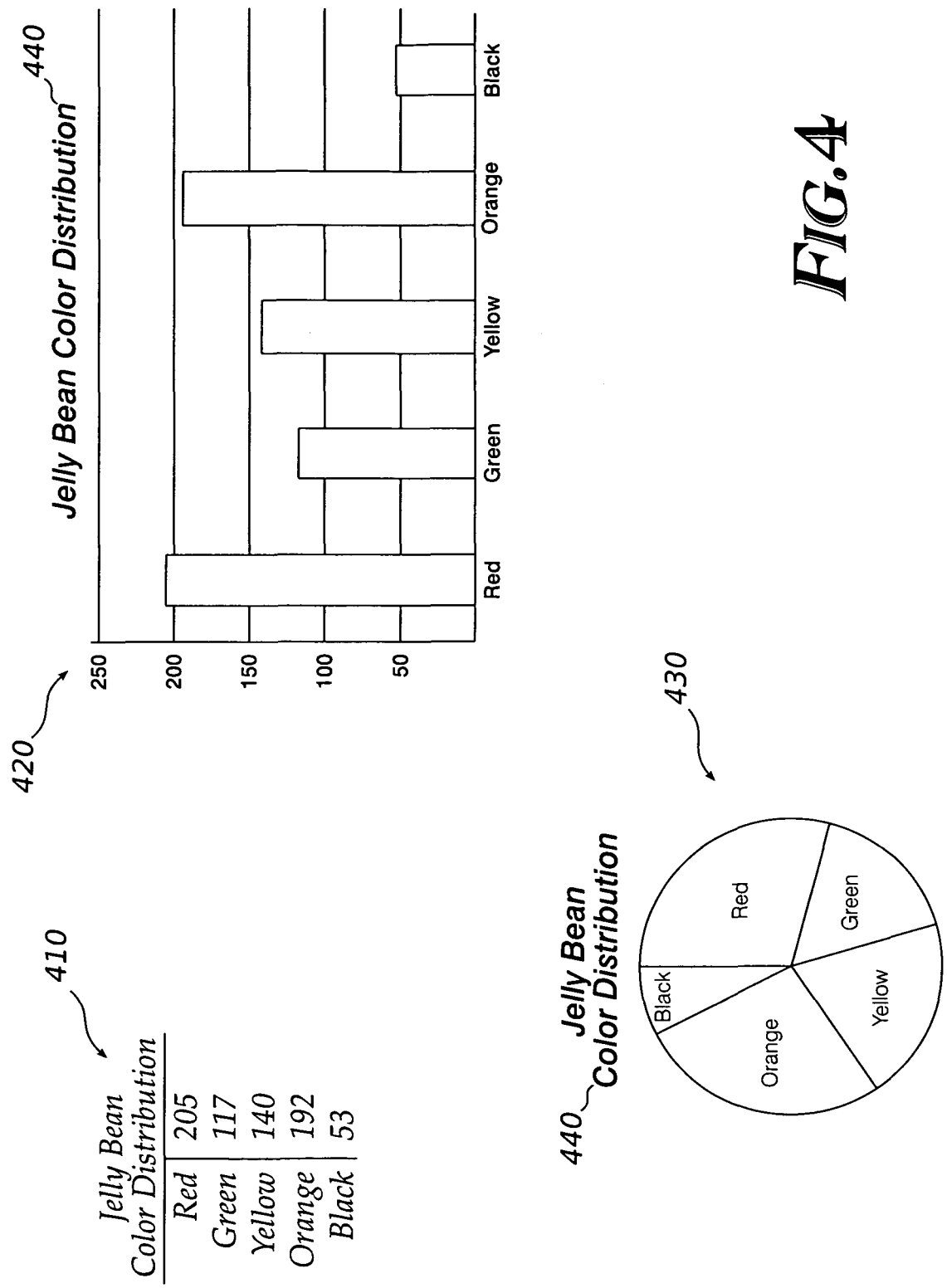
FIG. 4 shows a simple data array and two sample charts that could be produced by an embodiment of the invention.
Figure 5:
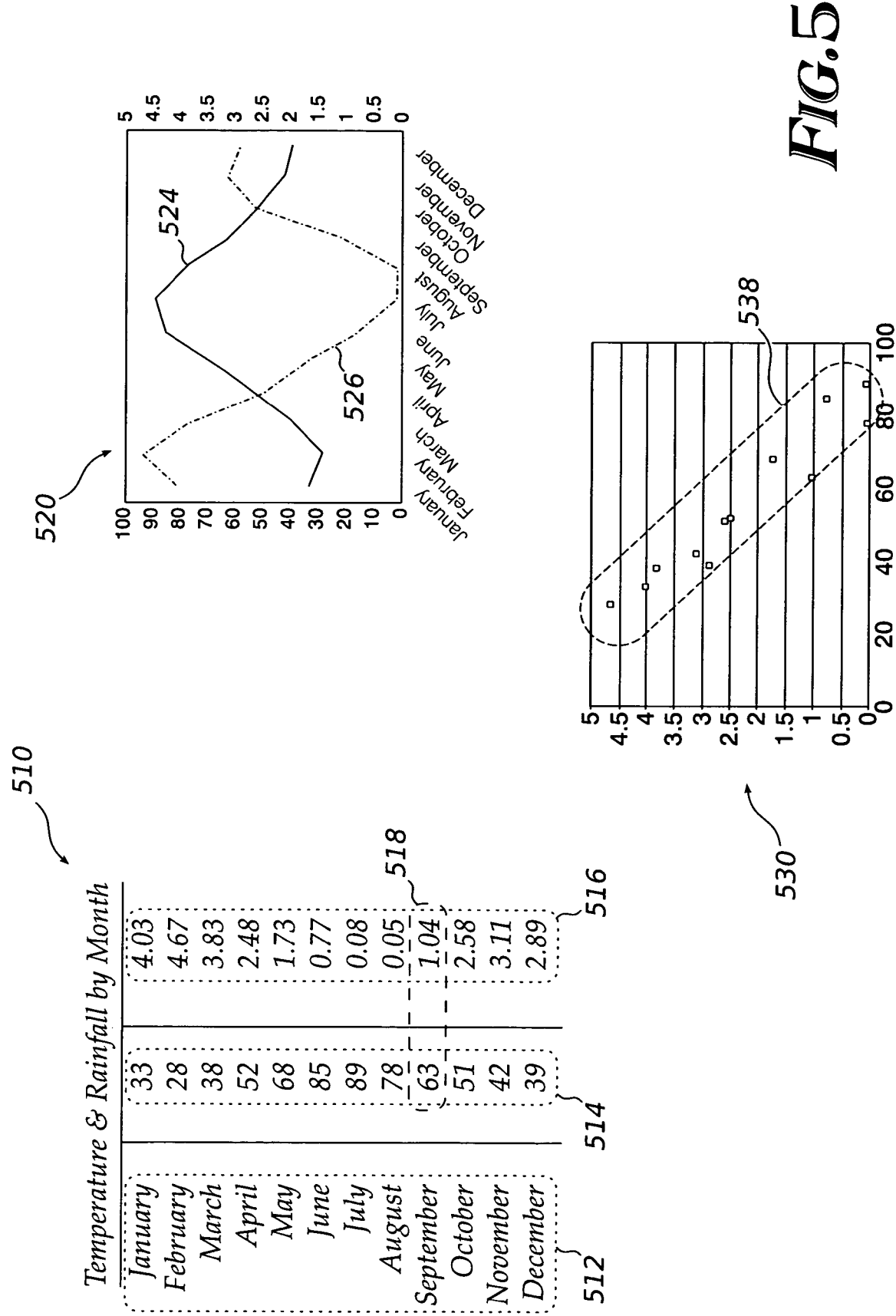
FIG. 5 shows a more complex data array and two sample charts that could be produced by an embodiment of the invention.

FIG. 4 shows a two-dimensional array of data 410 and two simple charts 420, 430 that could be produced from the array. A generic interface may also permit the client to specify auxiliary data such as a title 440 for the chart, or colors, fonts and text sizes. FIG. 5 shows another two-dimensional array of data 510 and two charts 520, 530 that could be produced from it. This Figure illustrates some data-formatting concerns that may be addressed by embodiments of the invention. Data array 510 contains three columns of information: month names 512, temperatures 514 and rainfall amounts 516. The temperatures 514 can be plotted together to produce trace 524 in chart 520, and the rainfall amounts 516 can be plotted together to produce trace 526 in chart 520. However, a user may wish to view a scatter plot like that shown as chart 530. This chart treats temperature and rainfall amounts from the same month (e.g. element 518) together, so data is processed "horizontally" rather than "vertically." Scatter plot chart 530 shows graphically that the data have a negative correlation between temperature and rainfall (i.e. higher rainfall correlates with lower temperature). Embodiments of the invention may include mechanisms within the generic chart interface to specify how data should be grouped for graphing.

FIG. 6 shows some components and subsystems of a computer system that implements an embodiment of the invention. Central Processing Units ("CPUs") 610 are programmable processors that execute instructions contained in memory 620. The instructions cause the system to perform methods according to embodiments of the invention. Some computer systems may have only one CPU. A hardware interface 620 produces signals to present information on a display 622, and interprets signals from user interface devices such as mouse 625 and keyboard 628. Network interface 640 is used to communicate over a distributed data network with other systems that participate in an embodiment. Mass storage interface 650 permits the system to read and write data on a storage medium such as hard disk 660. These (and other) components of the system exchange control and data signals via a system bus 670.

Some embodiments of the invention can interact with chart producers through a programmatic interface of the producer defined in a Common Object Broker Request Architecture ("CORBA") interface definition. Other interfaces may be defined using Interface Description Languages ("IDLs") of similar expressiveness. For example, the Component Object Model ("COM"), Distributed Component Object Model ("DCOM") and NET web services model provide frameworks to support one application's use of some of another application's functionality. By defining a generic chart interface, applications using the interface need not adapt their operations to match the requirements of many different chart producers. Furthermore, if one chart producer becomes unavailable, another producer may be substituted if both producers offer the charting functionality through a common interface.

An embodiment of the invention may be a machine-readable medium having stored thereon instructions which cause a programmable processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROM), Read-Only Memory (ROM), Random Access Memory (RAM), and Erasable Programmable Read-Only Memory (EPROM).

The applications of the present invention have been described largely by reference to specific examples and in terms of particular allocations of functionality to certain hardware and/or software components. However, those of skill in the art will recognize that generic chart generation interfaces can also be implemented by software and hardware that distribute the functions of embodiments of this invention differently than herein described. Such variations and implementations are understood to be captured according to the following claims.

We claim:

1. A method comprising:
supplying source data to a first chart producer through a generic interface, the source data to be used to create a chart;
receiving a Uniform Resource Locator ("URL") through the generic interface, the URL providing direct access to the chart created, wherein the generic interface is independent of the source data supplier and the first chart producer;
retrieving a representation of the chart created;
displaying the representation of the chart;
supplying updated source data to the first chart producer through the generic interface;
retrieving a representation of an updated chart directly through direct accessing the same URL; and
displaying the representation of the updated chart.

2. The method of claim 1 further comprising:
supplying additional source data to a second chart producer that is independent of the first chart producer through the generic interface, the additional source data to be used to create a second chart; and
receiving a second URL different from the first URL through the generic interface, the second URL providing direct access to the second chart, wherein
an interface of the first chart producer is different from an interface of the second chart producer.

3. The method of claim 1 wherein the URL identifies a resource available from a Hypertext Transfer Protocol ("HTTP") server.

4. The method of claim 1 wherein the URL provides access to a Hypertext Markup Language ("HTML") document.

5. The method of claim 1 wherein the URL provides access to an image file.

6. A computer-readable storage medium containing instructions to cause a programmable processor to perform operations comprising:
accepting data and parameters from a chart client;
adapting the data and parameters to a first format for a first chart producer of a plurality of chart producers at least some of which are independent of others in the plurality;
activating the selected chart producer to prepare a chart from the adapted data and according to the adapted parameters;
associating the chart to be directly accessible through a specific Uniform Resource Locator ("URL");
returning the specific URL to the chart client; and
updating the chart associated with the specific URL responsive to receipt of additional data from the chart client while maintaining accessibility of the updated chart directly through the specific URL.

7. The computer-readable storage medium of claim 6, the medium containing additional instructions to cause the programmable processor to perform operations comprising:
adapting the data and parameters to a second format for a second chart producer; and
activating the second chart producer, the second chart producer independent of the first chart producer, to produce a chart from the data and parameters adapted to the second format.

8. The computer-readable storage medium of claim 6, containing additional instructions to cause the programmable processor to perform operations comprising:
converting the chart to a raster graphic image, wherein the URL provides direct access to the raster graphic image.

9. The computer-readable storage medium of claim 6, containing additional instructions to cause the programmable processor to perform operations comprising:
transmitting the data and parameters from the chart client to the first chart producer; and
launching a Hypertext Markup Language ("HTML") browser to display the chart retrieved via the URL.

10. The computer-readable storage medium of claim 6, containing additional instructions to cause the programmable processor to perform operations comprising:
registering a web service to create a chart from data and parameters transmitted according to a generic protocol.

11. The computer-readable storage medium of claim 6 wherein accepting comprises receiving serialized data through a network connection.

12. The computer-readable storage medium of claim 6 wherein accepting comprises receiving the data and parameters as arguments to a subroutine invocation.

13. The computer-readable storage medium of claim 6 wherein activating comprises issuing a request to a charting web service.

14. The computer-readable storage medium of claim 6 wherein activating comprises launching a charting application in a batch mode.

15. A system comprising:
means for receiving data and parameters from a client according to a generic protocol;
means for interacting with a plurality of chart producers, wherein a first chart producer uses a first interaction protocol to communicate with chart consumers and a second chart producer, independent of the first chart producer, uses a second, different interaction protocol to communicate with chart consumers; and
means for publishing a chart created by one of the chart producers according to the data and parameters from the client.

16. The system of claim 15, further comprising:
means for providing an identifier of the chart to the client;
means for retrieving the chart from the publishing means; and
means for displaying the chart.

* * * * *